US012085032B2

(12) United States Patent
Tabata et al.

(10) Patent No.: US 12,085,032 B2
(45) Date of Patent: Sep. 10, 2024

(54) CONTROLLER AND CONTROL METHOD FOR ENGINE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Nobuhiko Satake, Toyota (JP); Daiki Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/434,226

(22) Filed: Feb. 6, 2024

(65) Prior Publication Data

US 2024/0271581 A1 Aug. 15, 2024

(30) Foreign Application Priority Data

Feb. 9, 2023 (JP) ................................ 2023-018545

(51) Int. Cl.
*F02D 41/02* (2006.01)

(52) U.S. Cl.
CPC .. *F02D 41/0235* (2013.01); *F02D 2200/0802* (2013.01)

(58) Field of Classification Search
CPC ..................... F02D 41/0235; F02D 2200/0802
See application file for complete search history.

(56) References Cited

U.S. PATENT DOCUMENTS 5,413,075 A * 5/1995 Mamiya .................. F02D 41/04 123/527
6,892,840 B2 * 5/2005 Meaney, Jr. ............. B60K 6/24 123/3
6,988,492 B2 * 1/2006 Shetley ............... F02D 19/0694 123/527
7,278,407 B2 * 10/2007 Natkin ................ F02D 41/0027 123/527
7,367,289 B2 * 5/2008 Ito ....................... F02D 41/3094 123/520

FOREIGN PATENT DOCUMENTS

JP H 06-200805 A 7/1994
JP 2007-056700 A 3/2007

* cited by examiner

*Primary Examiner* — Sizo B Vilakazi
(74) *Attorney, Agent, or Firm* — Finnegan, Henderson, Farabow, Garrett and Dunner, LLP

(57) ABSTRACT

A controller for an engine includes processing circuitry. The processing circuitry executes an obtaining process that obtains a catalyst temperature, which is a temperature of a catalyst. The processing circuitry executes a setting process that sets a target air-fuel ratio that is a target value of an air-fuel ratio in the cylinder. The temperature of the catalyst at which an efficiency of nitrogen oxide reduction by the catalyst is the highest is referred to as a prescribed temperature. In the setting process, the processing circuitry sets the target air-fuel ratio to be higher when the catalyst temperature is a first value that is lower than the prescribed temperature, than when the catalyst temperature is a second value that is lower than or equal to the prescribed temperature and higher than the first value.

7 Claims, 3 Drawing Sheets

CONTROLLER AND CONTROL METHOD FOR ENGINE

BACKGROUND

1. Field

The present disclosure relates to a controller and a control method for an engine.

2. Description of Related Art

Japanese Laid-Open Patent Publication No. 6-200805 discloses an engine system that includes an engine and a controller. The engine includes a cylinder, an exhaust passage, and a catalyst. The cylinder is a space in which hydrogen serving as fuel is burned. The exhaust passage is connected to the cylinder. The catalyst is located in the exhaust passage. The catalyst purifies exhaust gas flowing through the exhaust passage. Specifically, the catalyst reduces nitrogen oxides contained in the exhaust gas. The controller controls the engine. The controller increases the air-fuel ratio in the cylinder as the rotation speed of the crankshaft of the engine increases.

In the engine disclosed in the above-described publication, the air-fuel ratio in the cylinder is controlled such that most of the nitrogen oxides in the exhaust gas are reduced by the catalyst. However, the performance of nitrogen oxide reduction by the catalyst changes in accordance with the temperature of the catalyst. Thus, depending on the temperature of the catalyst, the performance of nitrogen oxide reduction by the catalyst may decrease and the nitrogen oxide may not be able to be reduced sufficiently.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller is configured to control an engine that includes a cylinder that defines a space for burning hydrogen serving as a fuel, an exhaust passage that is connected to the cylinder, and a catalyst that is located in the exhaust passage and reduces nitrogen oxides. The controller includes processing circuitry. The processing circuitry is configured to execute an obtaining process that obtains a catalyst temperature that is a temperature of the catalyst, and a setting process that sets a target air-fuel ratio that is a target value of an air-fuel ratio in the cylinder. A temperature of the catalyst at which an efficiency of nitrogen oxide reduction by the catalyst is the highest is referred to as a prescribed temperature. The processing circuitry is configured to, in the setting process, set the target air-fuel ratio to be higher when the catalyst temperature is a first value that is lower than the prescribed temperature, than when the catalyst temperature is a second value that is lower than or equal to the prescribed temperature and higher than the first value.

With the above-described configuration, in a relatively low-temperature state, in which the performance of nitrogen oxide reduction by the catalyst is not maximized, the air-fuel ratio in the cylinder increases when the catalyst temperature is the first value, which is relatively low. In an engine that uses hydrogen as the fuel, hydrogen can be burned stably even if the air-fuel ratio is increased. As the air-fuel ratio increases, the amount of nitrogen oxides generated in the cylinder decreases. In this regard, if the target air-fuel ratio is increased to limit the amount of nitrogen oxides generated in the cylinder as described above, the catalyst sufficiently removes nitrogen oxides even in a situation in which the performance of nitrogen oxide reduction by the catalyst is lowered.

In another general aspect, a method for controlling an engine is provided. The engine includes a cylinder that defines a space for burning hydrogen serving as a fuel, an exhaust passage that is connected to the cylinder, and a catalyst that is located in the exhaust passage and reduces nitrogen oxides. The method includes obtaining a catalyst temperature that is a temperature of the catalyst, and setting a target air-fuel ratio that is a target value of an air-fuel ratio in the cylinder. A temperature of the catalyst at which an efficiency of nitrogen oxide reduction by the catalyst is the highest is referred to as a prescribed temperature. The setting the target air-fuel ratio includes setting the target air-fuel ratio to be higher when the catalyst temperature is a first value that is lower than the prescribed temperature, than when the catalyst temperature is a second value that is lower than or equal to the prescribed temperature and higher than the first value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

Schematic Structure of Vehicle

An embodiment of the present disclosure will now be described with reference to FIGS. 1 to 4. First, a schematic configuration of a vehicle 100 will be described.

Figure 1:
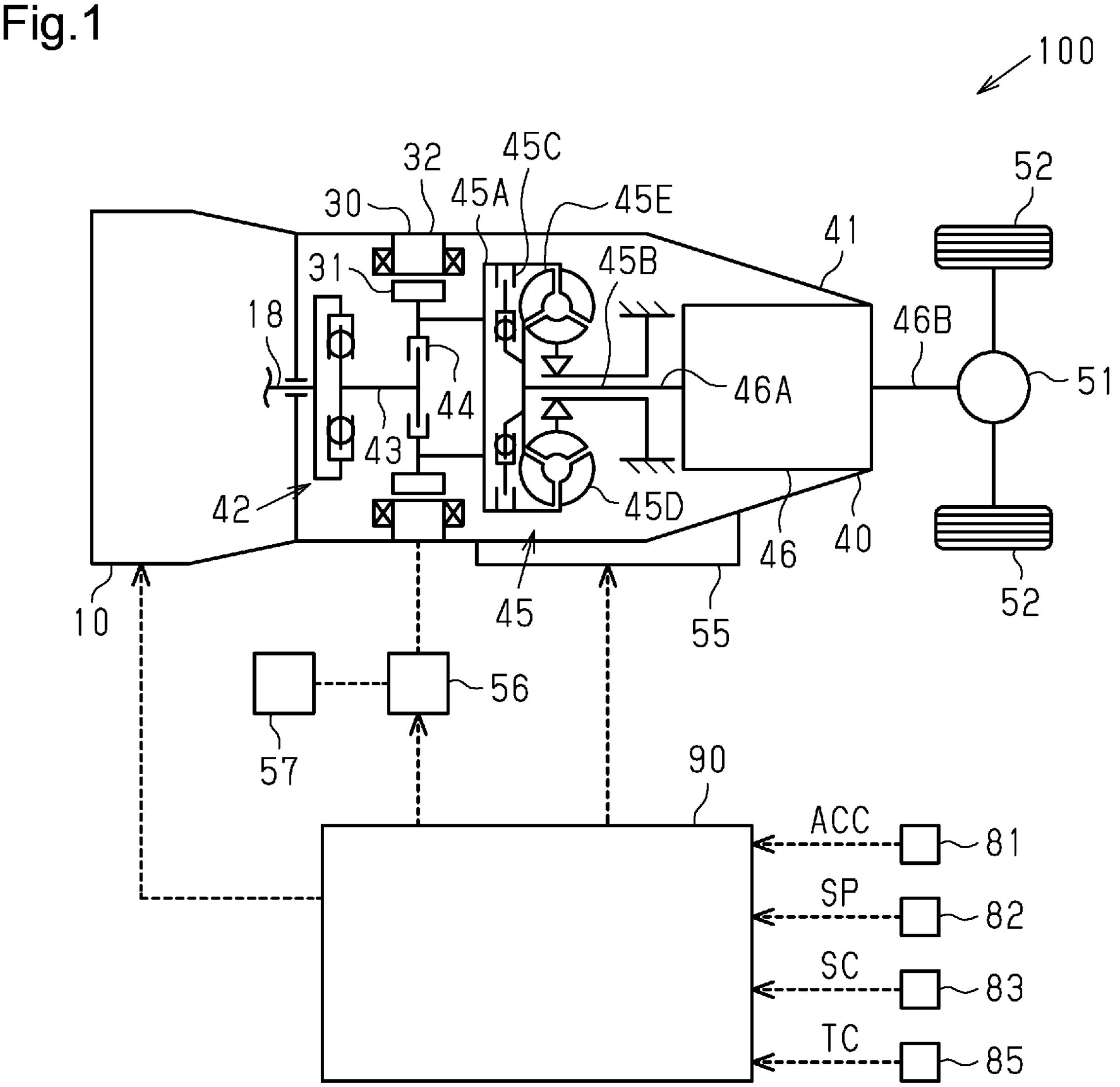
FIG. 1 is a schematic diagram showing a configuration of a vehicle.

As shown in FIG. 1, the vehicle 100 includes an engine 10 and a motor-generator 30. The engine 10 functions as a drive source of the vehicle 100. The engine 10 uses hydrogen as a fuel. The motor-generator 30 functions as a drive source of the vehicle 100. Therefore, the vehicle 100 is a so-called hybrid electric vehicle.

Figure 2:
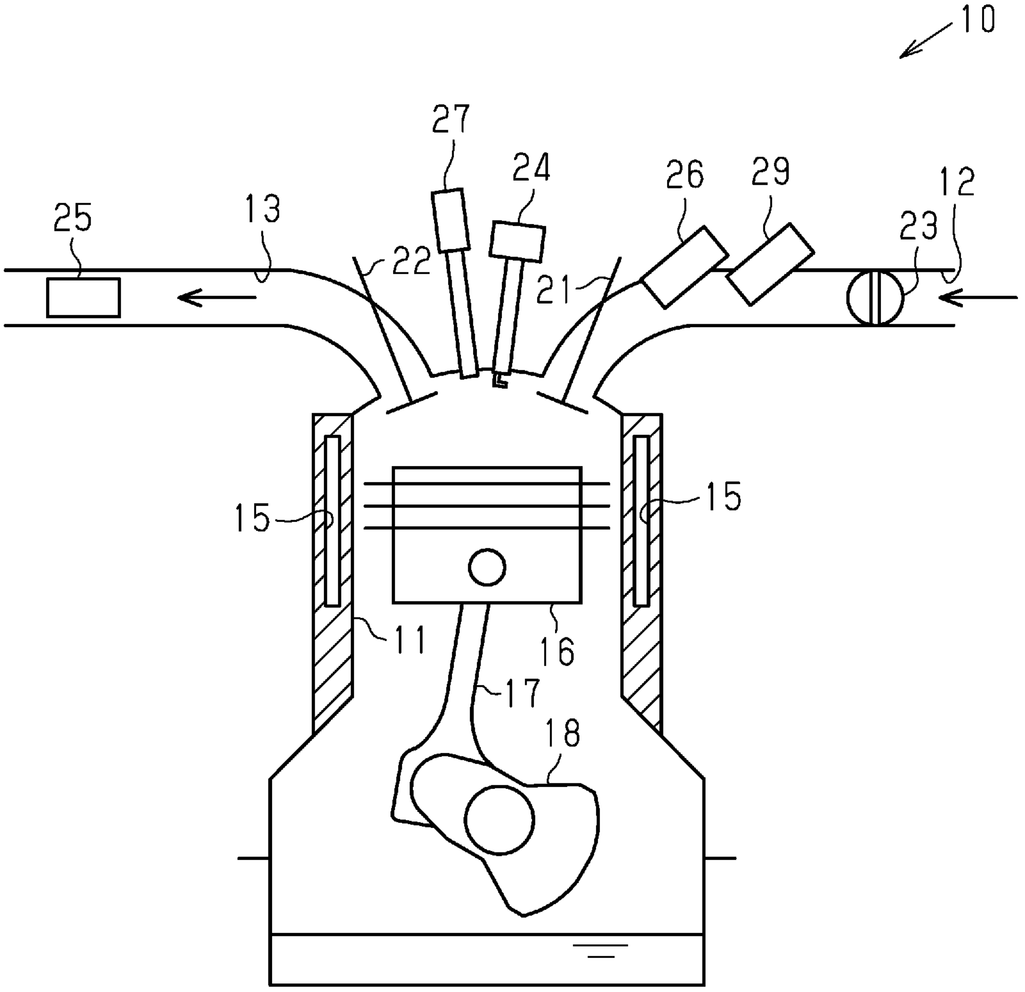
FIG. 2 is a schematic diagram of an engine.

As shown in FIG. 2, the engine 10 includes cylinders 11, an intake passage 12, and an exhaust passage 13. The engine 10 also includes pistons 16, connecting rods 17, a crankshaft 18, intake valves 21, and exhaust valves 22. Each cylinder 11 defines a space for burning mixture of fuel and intake air. In the present embodiment, the engine 10 includes four cylinders 11. Only one of the cylinders 11 is shown in FIG. 2.

Each piston 16 is located inside the corresponding cylinder 11. Each piston 16 is coupled to the crankshaft 18 via the corresponding connecting rod 17. Each piston 16 reciprocates in the corresponding cylinder 11 as mixture of fuel and intake air burns in the cylinder 11. The reciprocation of the pistons 16 rotates the crankshaft 18.

The intake passage 12 is connected to the cylinders 11. The intake passage 12 supplies intake air from outside the engine 10 to each of the cylinders 11. The exhaust passage 13 is connected to the cylinders 11. The exhaust passage 13 discharges exhaust gas from the cylinders 11 to the outside of the engine 10. The intake valves 21 are located at the downstream end of the intake passage 12. The intake valves 21 open and close the downstream end of the intake passage 12 with driving force from a valve actuation mechanism (not shown). The exhaust valves 22 are located at the upstream end of the exhaust passage 13. The exhaust valves 22 are opened and closed at the upstream end of the exhaust passage 13 by driving force from a valve actuation mechanism (not shown).

The engine 10 includes a throttle valve 23, ignition devices 24, a catalyst 25, port injection valves 26, direct injection valves 27, and water injection valves 29. The throttle valve 23 is located in the middle of the intake passage 12. The throttle valve 23 regulates the amount of intake air that flows through the intake passage 12.

The engine 10 includes four port injection valves 26 in correspondence with the four cylinders 11. In the intake passage 12, the distal end of each port injection valve 26 is located in the vicinity of the corresponding cylinder 11. Each port injection valve 26 injects hydrogen serving as fuel into the intake passage 12 to supply fuel to the corresponding cylinder 11 through the intake passage 12.

The engine 10 includes four direct injection valves 27 in correspondence with the four cylinders 11. The distal end of each direct injection valve 27 is located in the corresponding cylinder 11. Each direct injection valve 27 injects hydrogen serving as fuel into the corresponding cylinder 11, thereby supplying fuel into the cylinder 11.

The engine 10 includes four ignition devices 24 in correspondence with the four cylinders 11. The distal end of each ignition device 24 is located in the corresponding cylinder 11. Each ignition device 24 ignites a mixture of fuel and intake air by spark discharge. The catalyst 25 is located in the exhaust passage 13. The catalyst 25 purifies exhaust gas flowing through the exhaust passage 13. Specifically, the catalyst 25 reduces nitrogen oxides contained in the exhaust gas in the exhaust passage 13.

The engine 10 includes four water injection valves 29 in correspondence with the four cylinders 11. In the intake passage 12, the distal end of each water injection valve 29 is located in the vicinity of the corresponding cylinder 11. Each water injection valve 29 is supplied with water from a water tank (not shown). Each water injection valve 29 injects water into the intake passage 12. When vaporizing, the injected water cools the intake passage 12 and/or the cylinder 11. This cools the intake air supplied from the intake passage 12 to the cylinders 11 and the intake air in the cylinders 11.

The engine 10 includes a water jacket 15. The water jacket 15 is a space through which coolant flows. The water jacket 15 surrounds the cylinders 11. Coolant flows through the water jacket 15. The cylinders 11 are cooled through heat exchange with the coolant in the water jacket 15.

As shown in FIG. 1, the vehicle 100 includes a driving force transmitting device 40, a differential 51, and driven wheels 52.

The driving force transmitting device 40 includes a case 41, a damper 42, a connecting shaft 43, a clutch 44, a torque converter 45, and an automatic transmission 46. In addition to the motor-generator 30, the case 41 accommodates the damper 42, the connecting shaft 43, the clutch 44, the torque converter 45, and the automatic transmission 46. The motor-generator 30 includes a rotor 31 and a stator 32. The stator 32 is fixed to the case 41. The rotor 31 is rotatable relative to the stator 32.

The connecting shaft 43 has a first end that is connected to the crankshaft 18 of the engine 10 via the damper 42. The damper 42 transmits the driving force from the crankshaft 18 to the connecting shaft 43, while limiting fluctuation in torque of the crankshaft 18. The connecting shaft 43 has a second end that is connected to the rotor 31 of the motor-generator 30 via the clutch 44. The connection state of the clutch 44 is switched between the engaged state and the disengaged state in accordance with the pressure of oil supplied to the clutch 44.

The torque converter 45 includes an input shaft 45A, an output shaft 45B, a lock-up clutch 45C, a pump impeller 45D, and a turbine wheel 45E. The input shaft 45A is connected to the rotor 31 of the motor-generator 30. The pump impeller 45D is connected to the input shaft 45A. Thus, the pump impeller 45D is rotated by rotation of the input shaft 45A. When the pump impeller 45D rotates, the driving force is transmitted via the fluid to the turbine wheel 45E. This rotates the turbine wheel 45E. The turbine wheel 45E is connected to the output shaft 45B. The lock-up clutch 45C is configured to connect the input shaft 45A and the output shaft 45B to each other. The output shaft 45B is connected to the automatic transmission 46.

The automatic transmission 46 includes an input shaft 46A and an output shaft 46B. The input shaft 46A is connected to the output shaft 45B of the torque converter 45. The input shaft 46A is connected to the output shaft 46B by a clutch and gears (not shown). The automatic transmission 46 is configured to change a transmission gear ratio. The transmission gear ratio indicates the number of rotations of the input shaft 46A when the output shaft 46B completes one rotation. Thus, the rotation speed of the input shaft 46A relative to the output shaft 46B increases as the transmission gear ratio increases. The automatic transmission 46 may be of a multi-speed type. The output shaft 46B is connected to the left and right driven wheels 52 via the differential 51. The differential 51 allows the left and right driven wheels 52 to have different rotation speeds.

As shown in FIG. 1, the vehicle 100 includes a hydraulic system 55. The hydraulic system 55 controls the transmission gear ratio of the automatic transmission 46 by adjusting the pressure of oil supplied to the automatic transmission 46. The hydraulic system 55 also adjusts the pressure of oil supplied to the torque converter 45, thereby controlling the connection state of the lock-up clutch 45C of the torque converter 45. Further, the hydraulic system 55 controls the connection state of the clutch 44 by adjusting the pressure of oil supplied to the clutch 44.

As shown in FIG. 1, the vehicle 100 includes an inverter 56 and a battery 57. The battery 57 is a rechargeable battery. The inverter 56 regulates the amount of power transferred between the motor-generator 30 and the battery 57.

Electrical Configuration of Vehicle

As shown in FIG. 1, the vehicle 100 includes an accelerator pedal operation amount sensor 81, a vehicle speed sensor 82, a crank angle sensor 83, and a temperature sensor 85.

The accelerator pedal operation amount sensor 81 detects an accelerator pedal operation amount ACC, which is an operated depression amount of an accelerator pedal (not shown) by a driver. The vehicle speed sensor 82 detects a vehicle speed SP, which is the speed of the vehicle 100. The crank angle sensor 83 detects a crank angle SC, which is an angular position of the crankshaft 18. The temperature sensor 85 detects a catalyst temperature TC, which is the temperature of the catalyst 25.

As shown in FIG. 1, the vehicle 100 includes a controller 90. The controller 90 obtains various signals from the accelerator pedal operation amount sensor 81, the vehicle speed sensor 82, the crank angle sensor 83, and the temperature sensor 85. In the present embodiment, the controller 90 executes an obtaining process by obtaining the catalyst temperature TC, which is a value detected by the temperature sensor 85. The controller 90 calculates an engine rotation speed NE, which is the rotation speed of the crankshaft 18, based on the crank angle SC.

Based on the accelerator pedal operation amount ACC and the vehicle speed SP, the controller 90 calculates a vehicle required driving force, which is a required value of the driving force necessary for the vehicle 100 to travel. The controller 90 determines the torque distribution of the engine 10 and the motor-generator 30 based on the vehicle required driving force. The controller 90 controls the output of the engine 10 and the driving and regenerative operations of the motor-generator 30 based on the torque distribution of the engine 10 and the motor-generator 30.

The controller 90 controls the engine 10 by outputting control signals to the engine 10. Specifically, the controller 90 executes various kinds of control such as adjustment of the opening degree of the throttle valve 23, adjustment of the ignition timing of the ignition devices 24, adjustment of the fuel injection amount from the port injection valves 26, adjustment of the fuel injection amount from the direct injection valves 27, and adjustment of the water injection amount from the water injection valves 29. When controlling the motor-generator 30, the controller 90 outputs a control signal to the inverter 56. The controller 90 controls the motor-generator 30 by adjusting the amount of power transferred between the motor-generator 30 and the battery 57 through control of the inverter 56.

The controller 90 outputs a control signal to the hydraulic system 55 to control the connection state of the clutch 44 by using the hydraulic system 55. The controller 90 also outputs a control signal to the hydraulic system 55 to control the connection state of the lock-up clutch 45C of the torque converter 45 by using the hydraulic system 55. The controller 90 outputs a control signal to the hydraulic system 55 to control the transmission gear ratio of the automatic transmission 46 by using the hydraulic system 55.

When the vehicle 100 travels, the controller 90 selects one of an EV mode and an HV mode as the traveling mode of the vehicle 100. The EV mode is a traveling mode in which the vehicle 100 is caused to travel by driving the motor-generator 30 while stopping the engine 10. Thus, in the EV mode, the vehicle 100 travels using the driving force of the motor-generator 30. The HV mode is a traveling mode of the vehicle 100 in which the engine 10 is driven in addition to the motor-generator 30 to cause vehicle 100 to travel. Thus, in the HV mode, the vehicle 100 travels using the driving force of the engine 10 in addition to the driving force of the motor-generator 30.

The controller 90, for instance, selects the EV mode when there is sufficient surplus in the state of charge (SOC) of the battery 57, and the aforementioned vehicle required driving force is relatively small. Examples of the case in which the vehicle required driving force is relatively small include a case in which the vehicle 100 is started and a case in which the vehicle 100 travels under a light load with low acceleration. In contrast, when there is no sufficient surplus in the state of charge SOC of the battery 57, the controller 90 selects the HV mode.

The controller 90 may include processing circuitry including one or more processors that perform various processes according to computer programs (software). The controller 90 may be circuitry including one or more dedicated hardware circuits such as application specific integrated circuits (ASIC) that execute at least part of various processes, or a combination thereof. The processor includes a CPU and a memory such as a RAM and a ROM. The memory stores program codes or instructions configured to cause the CPU to execute processes. The memory, which is a computer-readable medium, includes any type of media that are accessible by general-purpose computers and dedicated computers.

Air-Fuel Ratio Setting Control

An air-fuel ratio setting control will now be described with reference to FIG. 3. The controller 90 repeatedly executes the air-fuel ratio setting control when driving the engine 10. The air-fuel ratio setting control sets a target air-fuel ratio AZ, which is a target value of an air-fuel ratio AFR in the cylinders 11. The air-fuel ratio AFR is a value obtained by dividing the mass of intake air supplied to each cylinder 11 by the mass of fuel supplied to the cylinder 11. Therefore, the air-fuel ratio AFR is represented by the following expression (1). Also, in the air-fuel ratio setting control, a reference air excess ratio λA, which is a reference value of an air excess ratio λ defined in a control map, is used to set the target air-fuel ratio AZ. The air excess ratio λ is a value obtained by dividing the air-fuel ratio AFR by the stoichiometric air-fuel ratio. Accordingly, the air excess ratio λ is represented by the following expression (2).

Air-fuel ratio AFR=Mass of intake air/Mass of fuel Expression (1)

Air excess ratio λ=Air-fuel ratio AFR/Stoichiometric air-fuel ratio Expression (2)

As described above, the engine 10 uses hydrogen as the fuel. Thus, the stoichiometric air-fuel ratio of the cylinders 11 of the engine 10 is approximately 34.

Figure 3:
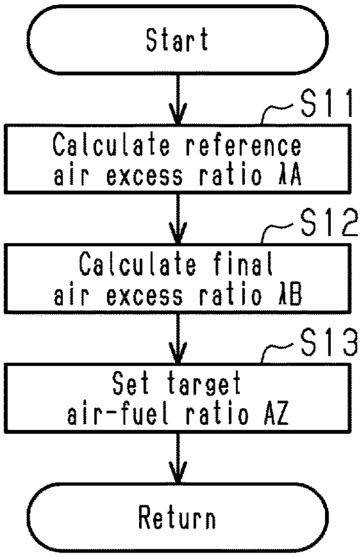
FIG. 3 is a flowchart showing an air-fuel ratio setting control.

As shown in FIG. 3, when starting the air-fuel ratio setting control, the controller 90 executes the process of step S11. In step S11, the controller 90 calculates the reference air excess ratio λA based on the catalyst temperature TC by referring to a predetermined control map.

Figure 4:
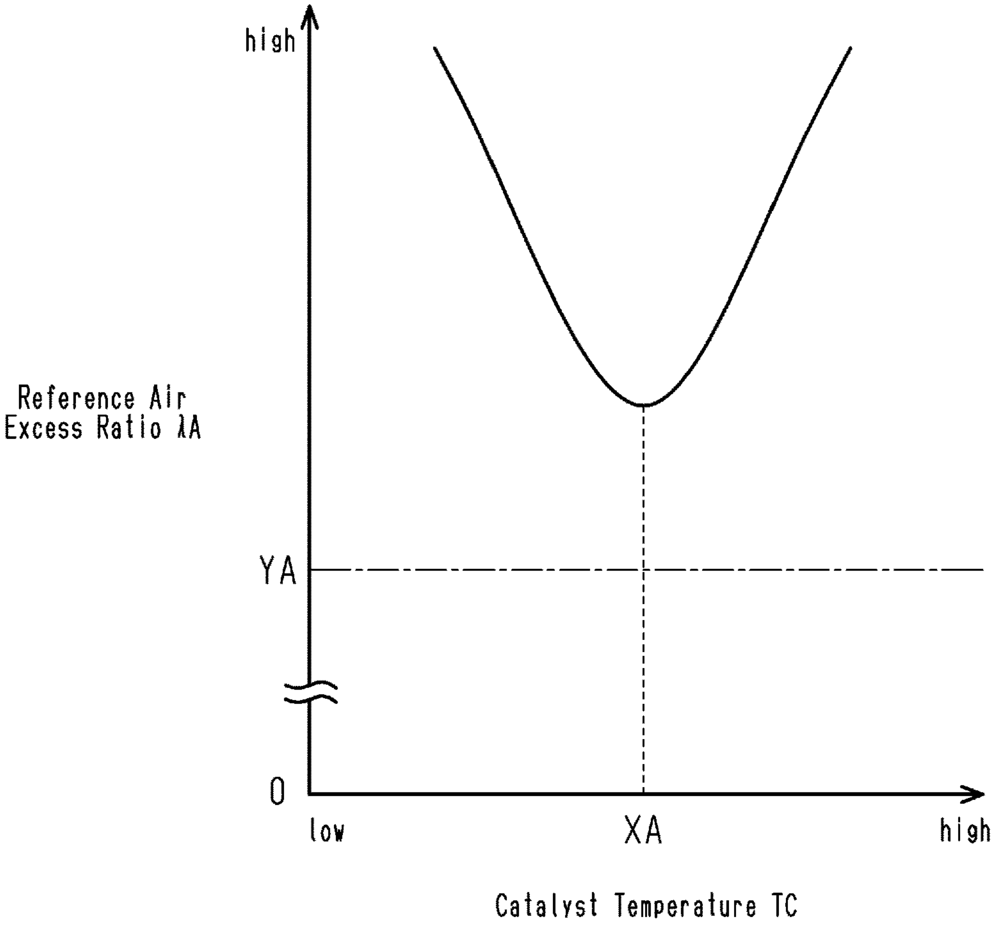
FIG. 4 is an explanatory diagram showing the relationship between a catalyst temperature and a reference air excess ratio.

As shown in FIG. 4, the control map defines the relationship between the catalyst temperature TC and the reference air excess ratio λA. The temperature of the catalyst 25 when the efficiency of nitrogen oxide reduction by the catalyst 25 is the highest is referred to as a prescribed temperature XA. In the control map, when the catalyst temperature TC is lower than or equal to the prescribed temperature XA, the reference air excess ratio λA increases as the catalyst temperature TC decreases. Also, in the control map, when the catalyst temperature TC is higher than the prescribed temperature XA, the reference air excess ratio λA increases as the catalyst temperature TC increases.

Therefore, when the catalyst temperature TC is the prescribed temperature XA, the reference air excess ratio λA is the lowest. The prescribed temperature XA is determined in advance through experiments and simulations. An example of the prescribed temperature XA is 200° C. to 300° C. Further, the reference air excess ratio λA is higher than the air excess ratio λ at the time when the amount of nitrogen oxides generated in the cylinders 11 is the largest.

Specifically, in the case of an engine 10 that uses hydrogen as fuel, the amount of nitrogen oxides in the cylinders 11 is the largest when the air excess ratio λ is approximately 1.2 to 1.3. The amount of nitrogen oxides in the cylinders 11 decreases as the air excess ratio λ increases as compared to a state in which the air excess ratio λ is approximately 1.2 to 1.3. In this regard, in the present embodiment, the reference air excess ratio λA is higher than 1.5 in all the regions regardless of the catalyst temperature TC. In step S11, the controller 90 plots the catalyst temperature TC on the control map to calculate the corresponding reference air excess ratio 2A. After step S11, the controller 90 advances the process to step S12.

As shown in FIG. 3, in step S12, the controller 90 calculates a correction value A based on the engine rotation speed NE. Specifically, the controller 90 calculates a greater value as the correction value A as the engine rotation speed NE increases. The correction value A is greater than zero. The controller 90 adds the correction value A to the reference air excess ratio λA to calculate a final air excess ratio λB. The final air excess ratio λB thus increases as the engine rotation speed NE increases. After step S12, the controller 90 advances the process to step S13.

In step S13, the controller 90 sets the target air-fuel ratio AZ based on the final air excess ratio λr. Specifically, the controller 90 multiplies the final air excess ratio λB by the value of the stoichiometric air-fuel ratio to convert the value of the final air excess ratio λB into the value of the air-fuel ratio AFR. The controller 90 sets the target air-fuel ratio AZ to the converted value. Accordingly, when the catalyst temperature TC is lower than or equal to the prescribed temperature XA, the target air-fuel ratio AZ increases as the catalyst temperature TC decreases. When the catalyst temperature TC is higher than the prescribed temperature XA, the target air-fuel ratio AZ increases as the catalyst temperature TC increases. The target air-fuel ratio AZ increases as the engine rotation speed NE increases.

As described above, the reference air excess ratio λA is higher than the air excess ratio λ at the time when the amount of nitrogen oxides generated in the cylinders 11 is the largest. The air-fuel ratio AFR at the time when the amount of nitrogen oxides generated in the cylinders 11 is the largest is referred to as a prescribed air-fuel ratio YA. Therefore, the target air-fuel ratio AZ is higher than the prescribed air-fuel ratio YA in all the regions regardless of the catalyst temperature TC. One example of the prescribed air-fuel ratio YA is approximately 40. In the present embodiment, steps S11, S12, and S13 are an example of a setting process.

The controller 90 executes an operation process based on the target air-fuel ratio AZ, which has been set through the setting process. In the operation process, the controller 90 controls the port injection valves 26 and the direct injection valves 27 of the engine 10 such that the actual air-fuel ratio AFR in the cylinders 11 becomes the target air-fuel ratio AZ. After step S13, the controller 90 ends the current air-fuel ratio setting control. Then, the controller 90 advances the process to step S11 again.

Operation of Present Embodiment

In the engine 10, when the catalyst temperature TC is lower than or equal to the prescribed temperature XA, the reduction performance of nitrogen oxides by the catalyst 25 decreases as the catalyst temperature TC decreases. In the engine 10, which uses hydrogen as fuel, hydrogen is stably burned in the cylinders 11 even if the air-fuel ratio AFR is increased. In the engine 10, the amount of nitrogen oxides generated in the cylinders 11 decreases as the air-fuel ratio AFR increases. In this regard, in the air-fuel ratio setting control, when the catalyst temperature TC is lower than or equal to the prescribed temperature XA, the controller 90 increases the target air-fuel ratio AZ as the catalyst temperature TC decreases. That is, the target air-fuel ratio AZ is higher when the catalyst temperature TC is a first value that is lower than the prescribed temperature XA, than when the catalyst temperature TC is a second value that is lower than or equal to the prescribed temperature XA and higher than the first value.

If the only objective is to confirm that the target air-fuel ratio AZ is higher when the catalyst temperature TC is the first value than when the catalyst temperature TC is the second value, it is not necessarily required to precisely define the standard temperature XA. The catalyst temperature TC at the time when the efficiency of the nitrogen oxide reduction by the catalyst 25 is the highest is generally determined in accordance with the type of the catalyst 25. Therefore, if sufficiently small values are set as the first value and the second value with respect to the temperature corresponding to the type of the catalyst 25, the values of the target air-fuel ratio AZ at different values of the catalyst temperature TC can be compared with each other even if the specific temperature XA is not determined precisely.

Advantages of Present Embodiment (1) In the present embodiment, the target air-fuel ratio AZ in the cylinders 11 is relatively high when the catalyst temperature TC is the first value, which is lower than the second value, in a situation in which the performance of nitrogen oxide reduction by the catalyst 25 is not fully exhibited due to the catalyst temperature TC being relatively low. Since the target air-fuel ratio AZ is relatively high, the amount of nitrogen oxide generated in the cylinder 11 is suppressed. As a result, even in a situation in which the performance of nitrogen oxide reduction by the catalyst 25 is lowered due to the catalyst temperature TC being relatively low, nitrogen oxides are sufficiently removed by the catalyst 25.

(2) In the air-fuel ratio setting control, when the catalyst temperature TC is lower than or equal to the prescribed temperature XA, the target air-fuel ratio AZ increases as the catalyst temperature TC decreases. As a result, the amount of nitrogen oxides generated in the cylinders 11 is limited when the performance of the nitrogen oxide reduction by the catalyst 25 decreases due to the catalyst temperature TC being relatively low.

(3) In the engine 10, when the catalyst temperature TC exceeds the prescribed temperature XA, the performance of nitrogen oxide reduction by the catalyst 25 decreases as the catalyst temperature TC increases. In this regard, in the air-fuel ratio setting control, when the catalyst temperature TC is higher than the prescribed temperature XA, the controller 90 increases the target air-fuel ratio AZ as the catalyst temperature TC increases. That is, the target air-fuel ratio AZ is higher when the catalyst temperature TC is a third value that is higher than the prescribed temperature XA, than when the catalyst temperature TC is a fourth value that is higher than or equal to the prescribed temperature XA and lower than the third value.

Thus, the target air-fuel ratio AZ in the cylinders 11 is relatively high when the catalyst temperature TC is the third value, which is higher than the fourth value, in a situation in which the performance of nitrogen oxide reduction by the catalyst 25 is not fully exhibited due to the catalyst temperature TC being relatively high. Since the target air-fuel ratio AZ is relatively high, the amount of nitrogen oxide generated in the cylinder 11 is suppressed. As a result, even in a situation in which the performance of nitrogen oxide reduction by the catalyst 25 is lowered due to the catalyst temperature TC being relatively high, nitrogen oxides are sufficiently removed by the catalyst 25.

(4) In the air-fuel ratio setting control, when the catalyst temperature TC is higher than the prescribed temperature XA, the target air-fuel ratio AZ increases as the catalyst temperature TC increases. As a result, the amount of nitrogen oxides generated in the cylinders 11 is limited when the performance of the nitrogen oxide reduction by the catalyst 25 decreases due to the catalyst temperature TC being relatively high.

(5) In the engine 10, the higher the engine rotation speed NE, the larger the amount of nitrogen oxides generated in the cylinders 11 per unit time tends to become. In this regard, in the air-fuel ratio setting control, the controller 90 increases the target air-fuel ratio AZ as the engine rotation speed NE increases. In other words, the target air-fuel ratio AZ is higher when the engine rotation speed NE is a fifth value than when the engine rotation speed NE is a sixth value, which is lower than the fifth value. Thus, in a situation in which the amount of nitrogen oxides generated in the cylinders 11 is likely to increase due to the engine rotation speed NE being relatively high, the target air-fuel ratio AZ increases, so that the amount of nitrogen oxides generated in the cylinders 11 is suppressed.

(6) In the air-fuel ratio setting control, the controller 90 sets the target air-fuel ratio AZ to be higher than the prescribed air-fuel ratio YA in all the regions regardless of the catalyst temperature TC. Thus, the prescribed air-fuel ratio YA for a case in which the amount of nitrogen oxides generated in the cylinders 11 is the largest will not be used as the target air-fuel ratio AZ.

Modifications

The above-described embodiment may be modified as follows. The above-described embodiment and the following modifications can be combined as long as the combined modifications remain technically consistent with each other.

In the above-described embodiment, the obtaining process may be changed.

For example, the controller 90 may obtain the catalyst temperature TC by estimating the catalyst temperature TC based on the operating state of the engine 10.

In the above-described embodiment, the air-fuel ratio setting control may be changed.

For example, the target air-fuel ratio AZ may be set regardless of the engine rotation speed NE. As a specific example, the controller 90 advances the process to step S13 after step S11. In step S13, the controller 90 simply needs to set the target air-fuel ratio AZ by converting the value of the reference air excess ratio λA.

For example, the process of setting the target air-fuel ratio AZ in a case in which the catalyst temperature TC is higher than the prescribed temperature XA may be changed. In a specific example, when the catalyst temperature TC is higher than the prescribed temperature XA, the controller 90 may increase the target air-fuel ratio AZ in a stepped manner as the catalyst temperature TC increases. In another specific example, when the catalyst temperature TC is higher than the prescribed temperature XA, the controller 90 may set the target air-fuel ratio AZ to be the same as when the catalyst temperature TC is the prescribed temperature XA.

For example, the process of setting the target air-fuel ratio AZ in a case in which the catalyst temperature TC is lower than or equal to the prescribed temperature XA may be changed. In a specific example, when the catalyst temperature TC is lower than or equal to the prescribed temperature XA, the controller 90 may increase the target air-fuel ratio AZ in a stepped manner as the catalyst temperature TC decreases.

For example, the target air-fuel ratio AZ in a case in which the catalyst temperature TC is the prescribed temperature XA may be the specified air-fuel ratio YA. Even in this case, the amount of nitrogen oxides generated in the cylinders 11 is suppressed by a greater extent as the target air-fuel ratio AZ increases.

In the above-described embodiment, the configuration of the vehicle 100 may be changed.

For example, the motor-generator 30, which is a drive source of the vehicle 100, may be omitted. That is, the technique of the present disclosure may be employed for any vehicle 100 that is at least equipped with the engine 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller configured to control an engine that includes a cylinder that defines a space for burning hydrogen serving as a fuel, an exhaust passage that is connected to the cylinder, and a catalyst that is located in the exhaust passage and reduces nitrogen oxides, the controller comprising processing circuitry, wherein the processing circuitry is configured to execute:

an obtaining process that obtains a catalyst temperature that is a temperature of the catalyst; and a setting process that sets a target air-fuel ratio that is a target value of an air-fuel ratio in the cylinder, a temperature of the catalyst at which an efficiency of nitrogen oxide reduction by the catalyst is the highest is referred to as a prescribed temperature, and the processing circuitry is configured to, in the setting process, set the target air-fuel ratio to be higher when the catalyst temperature is a first value that is lower than the prescribed temperature, than when the catalyst temperature is a second value that is lower than or equal to the prescribed temperature and higher than the first value.

2. The controller for the engine according to claim 1, wherein the processing circuitry is configured to, in the setting process, increase the target air-fuel ratio as the catalyst temperature decreases when the catalyst temperature is lower than or equal to the prescribed temperature.

3. The controller for the engine according to claim 1, wherein the processing circuitry is configured to, in the setting process, set the target air-fuel ratio to be higher when the catalyst temperature is a third value that is higher than the prescribed temperature, than when the catalyst temperature is a fourth value that is higher than or equal to the prescribed temperature and lower than the third value.

4. The controller for the engine according to claim 3, wherein the processing circuitry is configured to, in the setting process, increase the target air-fuel ratio as the catalyst temperature increases when the catalyst temperature is higher than or equal to the prescribed temperature.

5. The controller for the engine according to claim 1, wherein the processing circuitry is configured to, in the setting process, set the target air-fuel ratio to be higher when an engine rotation speed, which is a rotation speed of a crankshaft of the engine, is a fifth value, than when the engine rotation speed is a sixth value that is lower than the fifth value.

6. The controller for the engine according to claim 1, wherein the air-fuel ratio of the cylinder when an amount of nitrogen oxides generated in the cylinder is the largest is referred to as a prescribed air-fuel ratio, and the processing circuitry is configured to, in the setting process, set the target air-fuel ratio to be higher than the prescribed air-fuel ratio in all regions regardless of the catalyst temperature.

7. A method for controlling an engine, the engine including a cylinder that defines a space for burning hydrogen serving as a fuel, an exhaust passage that is connected to the cylinder, and a catalyst that is located in the exhaust passage and reduces nitrogen oxides, the method comprising:

obtaining a catalyst temperature that is a temperature of the catalyst; and setting a target air-fuel ratio that is a target value of an air-fuel ratio in the cylinder, wherein a temperature of the catalyst at which an efficiency of nitrogen oxide reduction by the catalyst is the highest is referred to as a prescribed temperature, and the setting the target air-fuel ratio includes setting the target air-fuel ratio to be higher when the catalyst temperature is a first value that is lower than the prescribed temperature, than when the catalyst temperature is a second value that is lower than or equal to the prescribed temperature and higher than the first value.

* * * * *